US012567439B1

(12) United States Patent
Kapoor et al.

(10) Patent No.: US 12,567,439 B1
(45) Date of Patent: Mar. 3, 2026

(54) ENERGY-ASSISTED RECORDING HEAD HAVING COATED NANOROD NEAR-FIELD TRANSDUCER

(71) Applicant: Seagate Technology LLC, Fremont, CA (US)

(72) Inventors: Manish Kapoor, Minneapolis, MN (US); Jason B. Gadbois, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/969,654

(22) Filed: Dec. 5, 2024

Related U.S. Application Data

(60) Provisional application No. 63/608,485, filed on Dec. 11, 2023.

(51) Int. Cl.
*G11B 5/48* (2006.01)
*G11B 5/00* (2006.01)

(52) U.S. Cl.
CPC .... *G11B 5/4866* (2013.01); *G11B 2005/0021* (2013.01)

(58) Field of Classification Search
CPC .................. G11B 5/4866; G11B 5/314; G11B 2005/0021; G11B 2005/0005; G11B 7/131; G11B 7/1205; G11B 7/1374; G11B 7/1384; G11B 5/6088
USPC .......................................... 360/59
See application file for complete search history.

(56) References Cited

U.S. PATENT DOCUMENTS

| | | | |
|---|---|---|---|
| 8,514,673 | B1 | 8/2013 | Zhao |
| 8,848,494 | B2 | 9/2014 | Sasaki |
| 9,672,848 | B2 | 6/2017 | Blaber |
| 9,728,209 | B2 | 8/2017 | Chen |
| 9,799,352 | B1 | 10/2017 | Chen |
| 9,824,709 | B2 | 11/2017 | Blaber |
| 10,242,702 | B1 | 3/2019 | Peng |
| 10,410,664 | B1 | 9/2019 | Cheng |
| 11,380,354 | B2 * | 7/2022 | Peng ...................... G11B 5/314 |
| 11,798,582 | B2 | 10/2023 | Puri |

* cited by examiner

*Primary Examiner* — Nabil Z Hindi
(74) *Attorney, Agent, or Firm* — Mueting Raasch Group

(57) ABSTRACT

A near-field transducer for an energy-assisted, magnetic recording head includes a first part comprising a first plasmonic material. The first part has an enlarged portion configured to receive optical energy from a waveguide and a narrowed portion that receives and channels the optical energy to a recording medium. The near-field transducer includes a second part comprising a nanorod of a second plasmonic material different than the first plasmonic material. The nanorod is disposed within the first part along a light propagation direction of the near-field transducer and extends to a media-facing surface of the recording head along a light propagation direction. The narrowed portion of the first part covers at least three sides of the nanorod along the light propagation direction. The nanorod has an exposed end that is exposed from the near-field transducer and faces the media-facing surface.

19 Claims, 6 Drawing Sheets

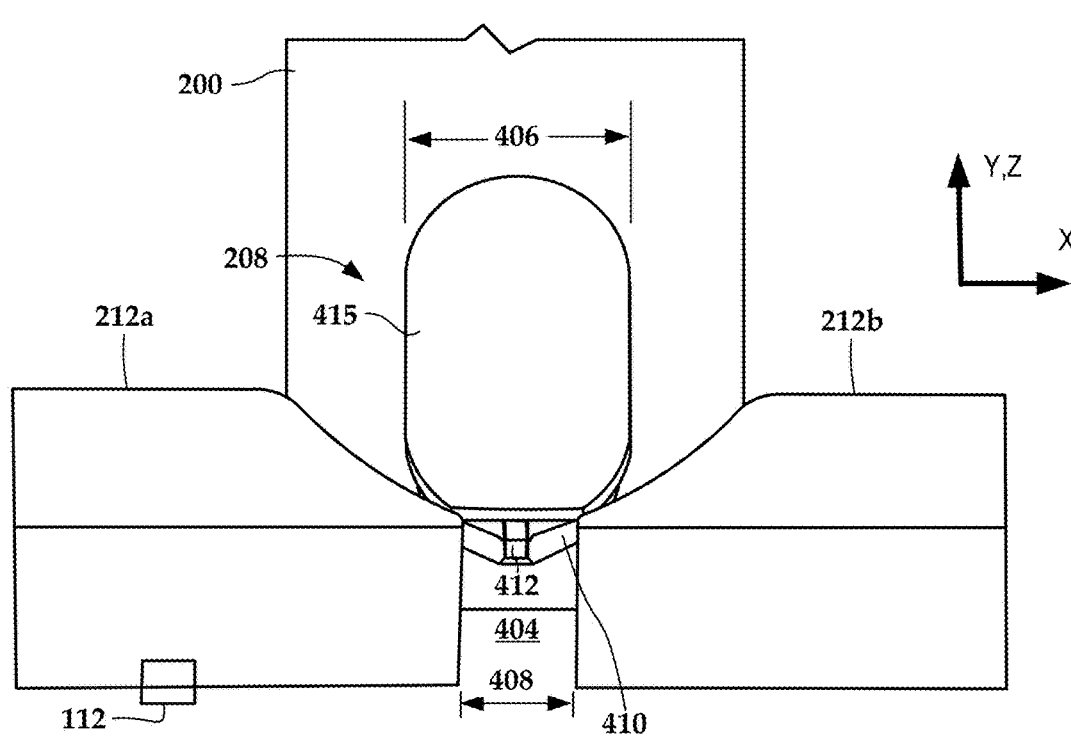
FIG. 4
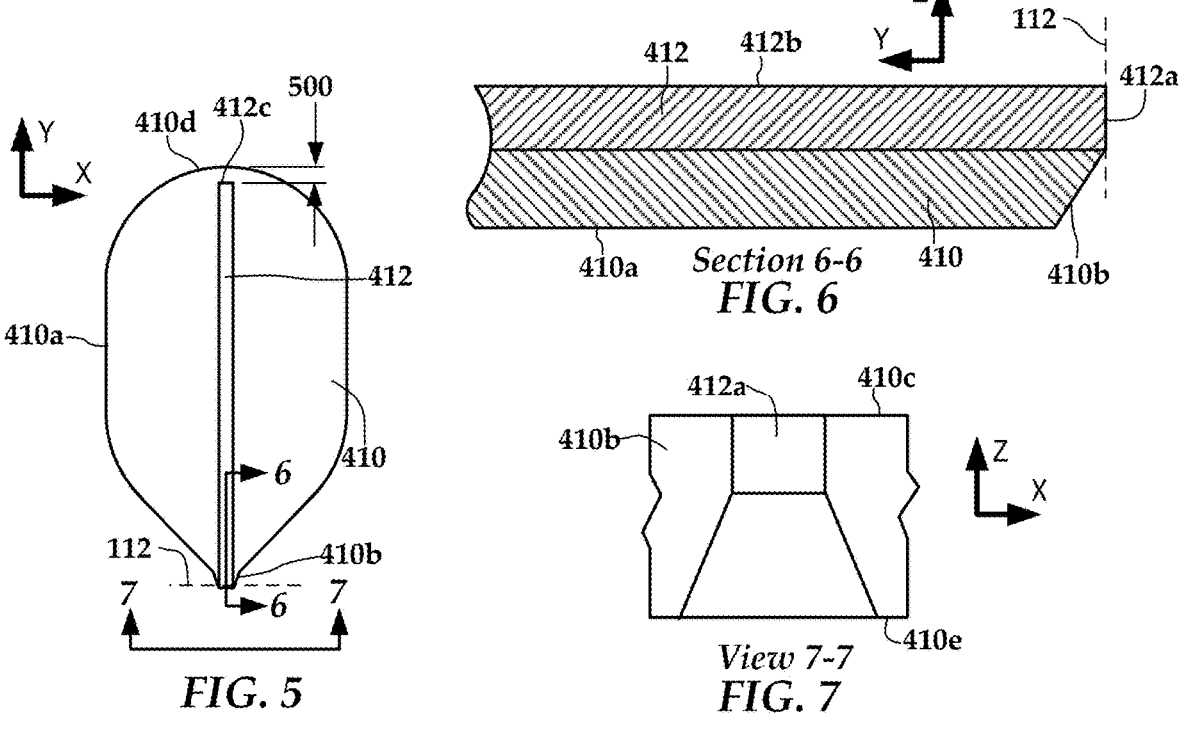
*Section 6-6*
FIG. 6
FIG. 5
*View 7-7*
FIG. 7

ENERGY-ASSISTED RECORDING HEAD HAVING COATED NANOROD NEAR-FIELD TRANSDUCER

CROSS REFERENCE TO RELATED APPLICATIONS

This application claims the benefit of 63/608,485, filed Dec. 11, 2023, the disclosure of which is incorporated by reference herein in its entirety.

SUMMARY

The present disclosure is directed to an energy-assisted recording head having a coated nanorod near-field transducer. In one embodiment, a near-field transducer for an energy-assisted, magnetic recording head includes a first part comprising a first plasmonic material. The first part has an enlarged portion configured to receive optical energy from a waveguide and a narrowed portion that receives and channels the optical energy to a recording medium. The near-field transducer includes a second part comprising a nanorod of a second plasmonic material different than the first plasmonic material. The nanorod is disposed within the first part along a light propagation direction of the near-field transducer and extends to a media-facing surface of the recording head along a light propagation direction. The narrowed portion of the first part covers at least three sides of the nanorod along the light propagation direction. The nanorod has an exposed end that is exposed from the near-field transducer and faces the media-facing surface.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 4 is a perspective view of a near-field transducer according to an example embodiment;

FIG. 5 is a wafer plane view of the near-field transducer of FIG. 4;

FIG. 6 is a cross-sectional view of the near-field transducer of FIG. 4;

FIG. 7 is a media-facing surface view of the near-field transducer of FIG. 4

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

A HAMR write transducer described below uses a plate-type NFT with an enlarged part that collects optical energy being directed on it by adjacent reflectors. The NFT is shaped with a peg directed toward the recording medium, and energy in the form of surface plasmons is directed towards the peg where it is shaped and directed to heat the recording medium. The NFT may have other features such as heat sinks, sunken plates, etc., which helps ensure desired performance and longevity of the NFT.

One way to achieve ever-higher areal density capacity (ADC) for disk storage is to decrease the size of the optical hotspot on the media. One approach to reducing hotspot size is reducing the crosstrack dimension of the peg part of the NFT. While forming a peg that meet the target size (e.g., less than 40 nm, less than 20 nm, etc.) is within process capabilities, such small structures may have an issue from a reliability standpoint. For example, the high concentration of energy causes significant heating at the peg, and this heating can degrade the peg over time, as well as surrounding materials.

In embodiments described below, an NFT design is described with a peg that can be manufactured at a size that can meet the desired dimension requirements. The peg includes heat-sinking features to cool down the peg and includes materials that can withstand a harsh thermal environment. This design is generally referred to as a "pencil," in that it has a metallic core part surrounded on at least three sides by another metal. While both metals of the core and surround are thermally robust compared to commonly-used in NFT metals such as Au, the arrangements and compositions described below leverage the different capabilities of each metal such that improved performance and reliability can be achieved.

Figures 1, 2:
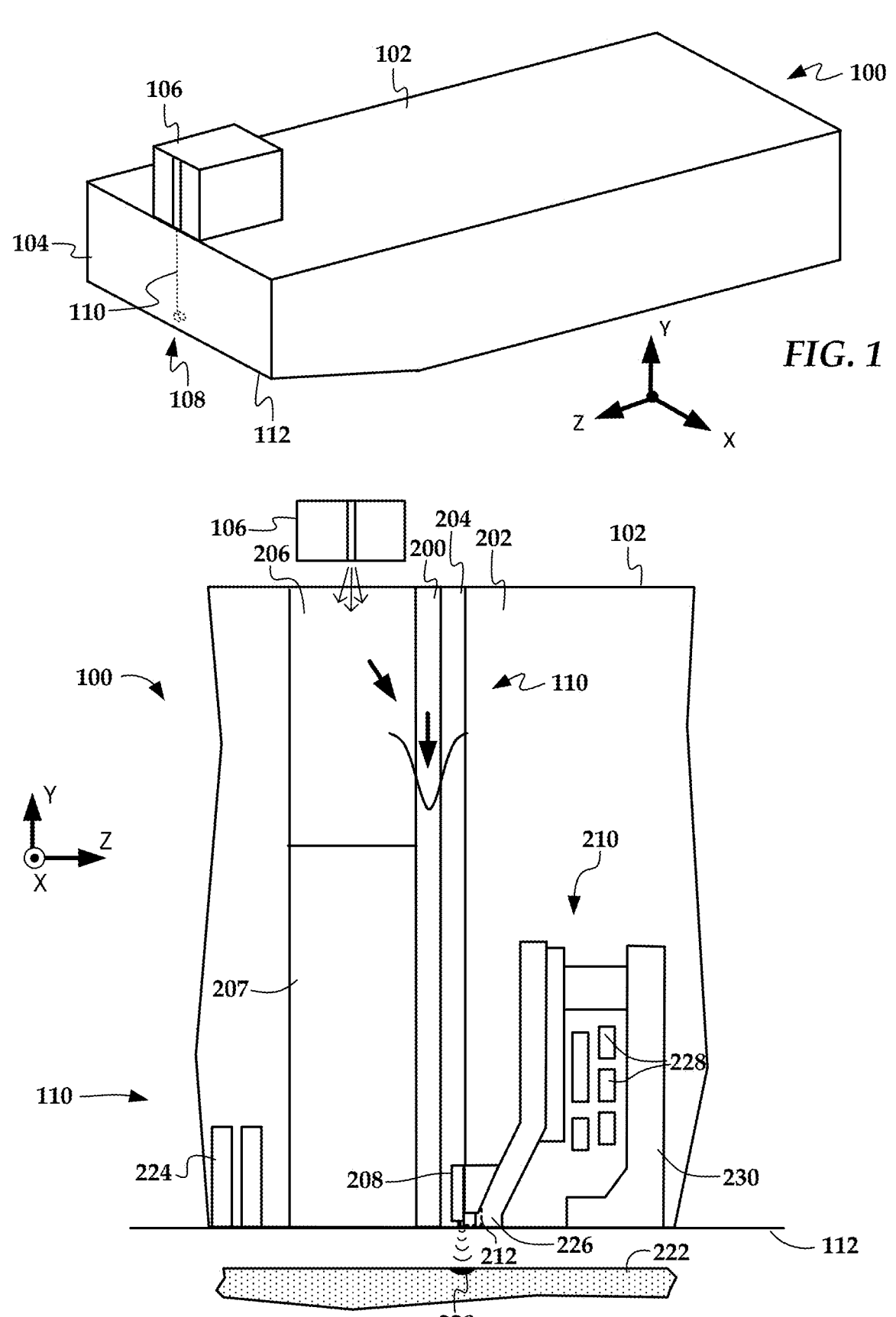
FIG. 1 is a perspective view of a slider assembly according to an example embodiment.
FIG. 2 is a cross-sectional view of a slider along a down-track plane according to according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, and recording head. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

Figure 3:
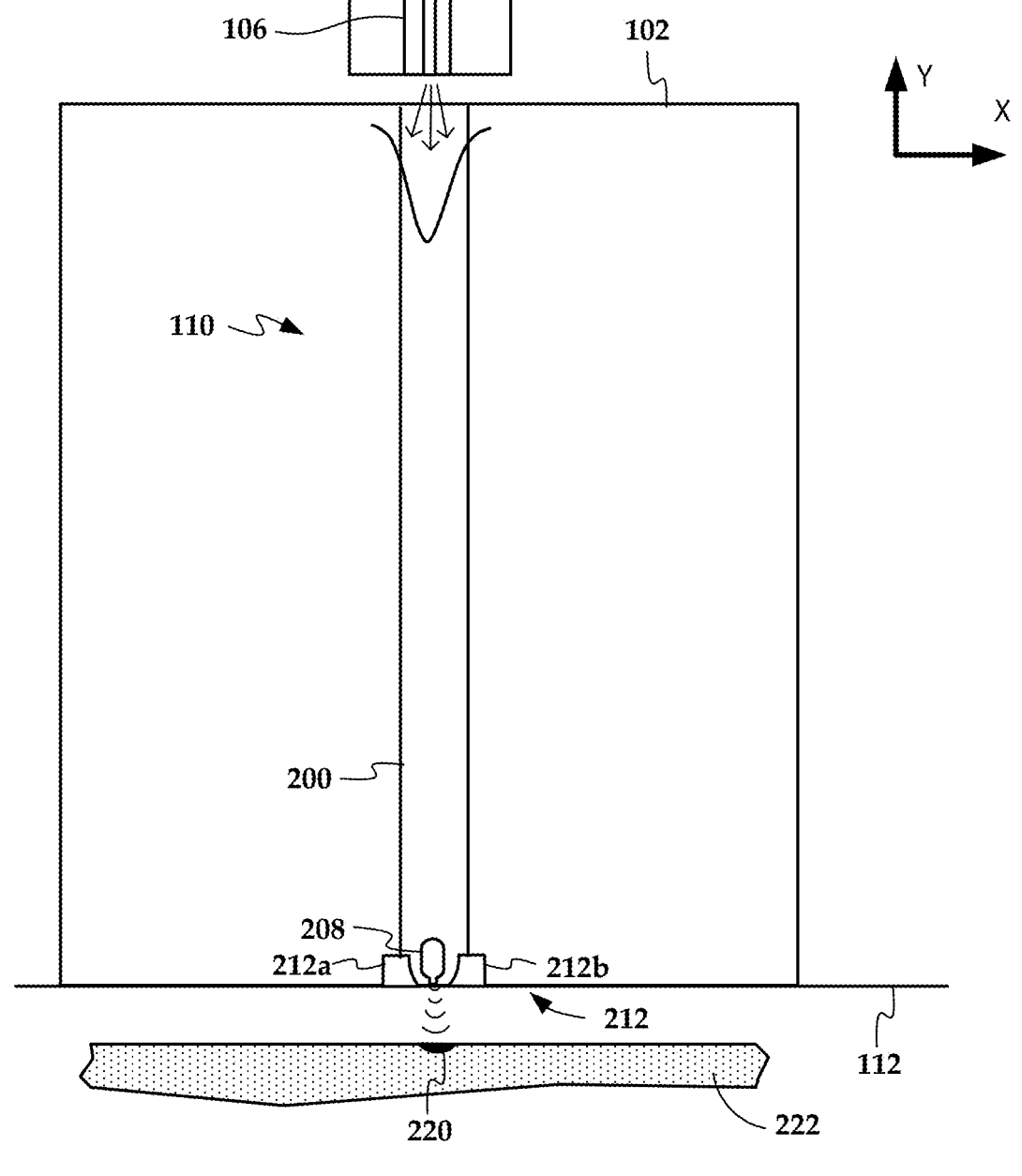
FIG. 3 is a wafer plane view of a slider according to an example embodiment.

In FIGS. 2 and 3, respective cross-sectional and wafer plane views of the slider body 102 show a light delivery system according to an example embodiment. The slider body includes an NFT 208, a magnetic writer 210 and a mirror assembly 212, sometimes referred to as a subwavelength mirrors, subwavelength focusing mirrors, subwavelength solid immersion mirrors (SIMs), mini-SIMs, mSIMs, etc. Light, emitting from the laser diode 106, is coupled into a three-dimensional, single mode channel waveguide 110 by a waveguide input coupler 206, which directs the light to a waveguide core 200. The input coupler 206 is replaced by a bottom cladding layer 207 towards the media-facing surface 112. Note that other waveguide and input coupler arrangements may be used with the NFT 208 and mirror assembly 212.

The NFT 208 has an enlarged part with two curved ends and a protruded peg. Other shapes may be possible for the enlarged part of the NFT 208, e.g., rectangular, triangular. The NFT 208 is placed proximate a side cladding layer 204 and top cladding layer 202 of the waveguide 110 and near the waveguide core 200. The NFT 208 could be also placed into the waveguide core 200. The NFT 208 achieves plasmonic resonance in response to the light coupled via the waveguide 110 and creates a small hotspot 220 on a surface of a recording medium 222 (e.g., magnetic disk) during recording.

The NFT 208 is proximate a write pole 226 of the writer 210. The writer 210 includes coils 228 that induce a magnetic flux through the write pole 226. A flux path is created between the write pole 226 and a return pole 230 of the writer 210. There may be more than one return pole, e.g., on a side of the NFT 208 facing the reader.

A magnetic reader 224 is shown down-track from the NFT 208 and magnetic writer 210. The magnetic reader 224 may include a magneto-resistive stack that changes resistance in response to changes in magnetic field detected from the recording medium 222. These changes in magnetic field are converted to data by a read channel of an apparatus that houses the head 100 and recording medium 222 (e.g., hard disk drive assembly).

In FIG. 4-8, diagrams illustrate details of an NFT 208 according to an example embodiment. The diagram in FIG. 4 is a perspective view seen from the media-facing surface 112 and the diagram in FIG. 5 is a plan view on a substrate-parallel plane. The diagram in FIG. 6 is a cross-sectional view taken along section line 6-6 in FIG. 5, and the diagram in FIG. 7 is an ABS view based on section line 7-7 in FIG. 5. A pair of subwavelength focusing mirrors 212a, 212b is located at an end of the waveguide core 200 proximate the media-facing surface 112. The subwavelength focusing mirrors 212a, 212b are on opposite crosstrack sides of the near-field transducer 208 and separated from each other by a crosstrack gap 404. The width 408 of crosstrack gap 404 may be less than a corresponding crosstrack width 406 of the NFT 208. For example, the crosstrack gap width 408 may be 200 nm or less, e.g., 160 nm, 120 nm, 75 nm, 50 nm, 40 nm, 30 nm, etc.

As seen in FIGS. 4-8, the near-field transducer 208 has a first part 410 with an enlarged portion 410a and a narrowed portion 410b configured to receive optical energy from a waveguide 200 and channel the optical energy to a recording medium 222. A second part of the near-field transducer comprises a nanorod 412 disposed within the first part 410 along a light propagation direction (y-direction) of the near-field transducer 208. The nanorod 412 extends to the media-facing surface 112 of the recording head along the light propagation direction. The narrowed portion 410b of the first part 410 covers at least three sides of the nanorod 412 along the light propagation direction. A seen best in FIGS. 6 and 7, the end 412a of nanorod 412 is exposed from the near-field transducer 208 at the media facing surface 112. This does not require that the nanorod end 412a be exposed from the recording head, as the media-facing surface of the head may be coated with a diamond like coating (DLC) or the like, which may cover the exposed end 412a of the nanorod 412 as well. A top surface 412b of the nanorod 412 is also exposed from the near-field transducer 208.

In some embodiments the first plasmonic material comprises Ir and/or the second plasmonic material comprises Rh. In other embodiments, the first and second plasmonic metals may be any combination of Ir, Rh, Au, Pd, Pt, and Os. A first downtrack-facing surface 410c (see FIG. 7) of the first part 410 faces a write pole 226 (see FIG. 2) such that the nanorod 412 is between the part and the write pole 226. A second downtrack-facing surface 410e is opposed to the first downtrack-facing surface 410c as seen in FIG. 7. Also seen in FIG. 7, the narrowed portion 410b forms three bevels surrounding the nanorod 412, and proximate the exposed end 412a of the nanorod 412, the surrounding thickness of the narrowed portion 410b is approximately zero.

Figure 8:
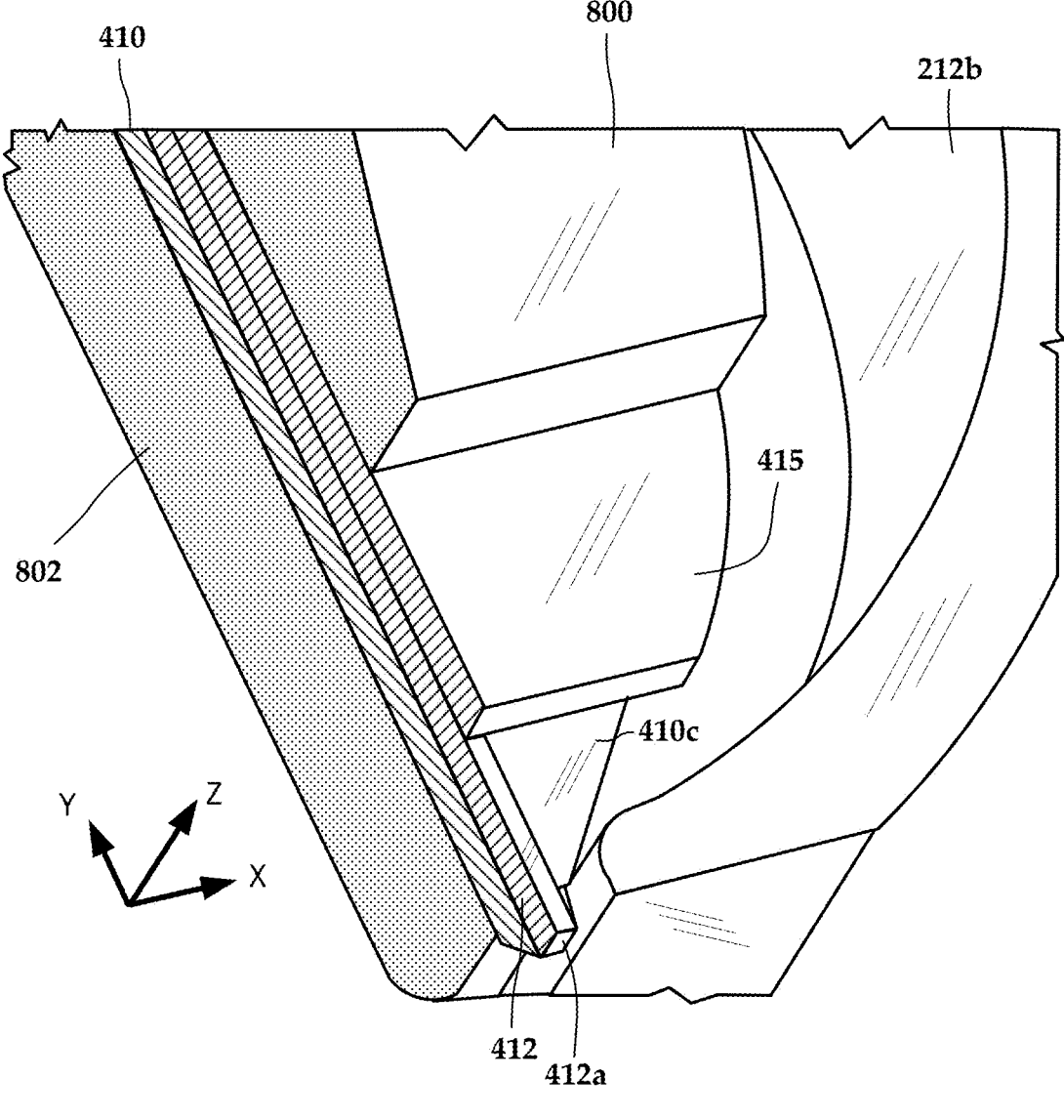
FIG. 8 is a perspective cutaway view showing a near-field transducer according to an example embodiment.

As seen in FIGS. 4 and 8, a middle disc (MDSC) 415 is located on top of the first and second parts 410, 412. As seen in FIG. 8, a heat sink 800 thermally couples the NFT 208 to the write pole 226. Facing away from the write pole 226 is a sunken disc (SDSC) 802 also referred to as a bottom disc (BDSC). A description of composition and function of the MDSC and SDSC can be found, for example, in commonly owned U.S. Pat. No. 11,798,582, dated Oct. 24, 2023, which is hereby incorporated by reference.

As seen in FIG. 5, an end 412c the nanorod 412 extends to an end 410d of the first part 410. The ends 412c, 410d are opposed to the exposed end 412a of the nanorod 412. In this example the ends 412c, 410d are separated by a distance 500, which in this example is about 5% of the total length of the first part 410 along the light propagation direction. In other embodiments, there may be no gap (distance 500 is zero) or a larger gap (e.g., distance 500 is about 6%-90% of the total length of the first part 410 along the light propagation direction).

Figure 9:
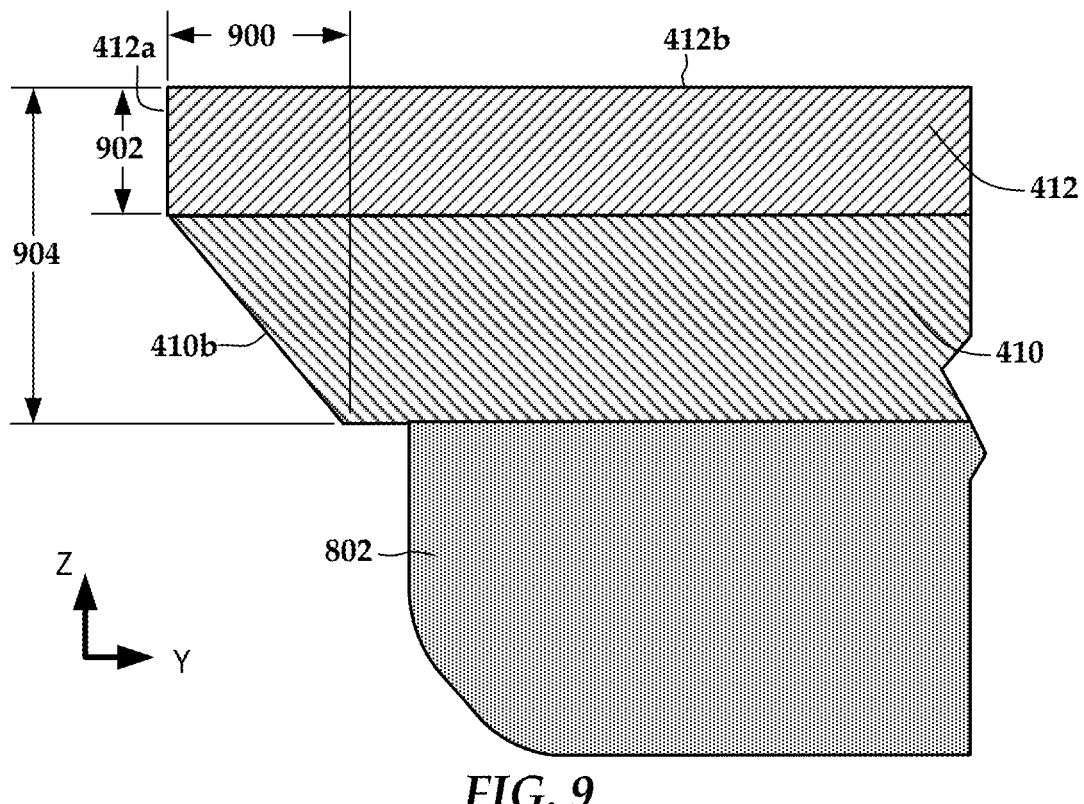
FIGS. 9 and 10 are respective cross-sectional and plots wafer plane views showing details of a near-field transducer peg according to example embodiments.
Figure 10:
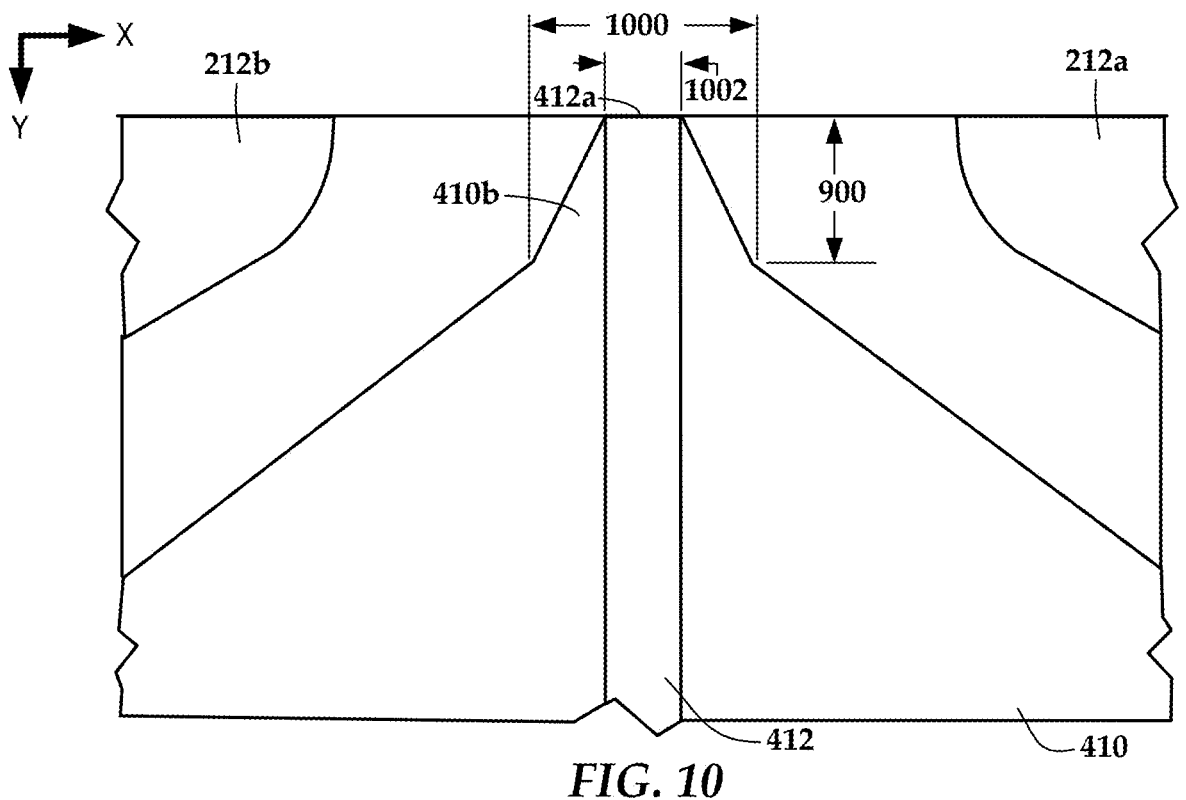

In order to achieve a desired ADC goal, the dimensions of the NFT may be defined to obtain a desired sized hot spot. An example of dimensions that are expected to reach those goals is shown in the cross-sectional view of FIG. 9 and the substrate-parallel view of FIG. 10. The length of the peg 900 is about 25 nm, which is the distance that the narrowed portion 410b extends from the enlarged portion 410a. Other peg lengths may be implemented, e.g., between 40 nm and 15 nm. The height 902 of the nanorod 412 is about 15 nm. The total height 904 of the first part 410 is about 40 nm. The largest crosstrack width 1000 of the narrowed portion 410b is about 40 nm. The crosstrack width 1002 of the nanorod 412 is about 15 nm, which is the same as the height 902, resulting in the exposed end 412a having a square shape projected on the media-facing surface plane. The exposed end 412a may have different shapes (e.g., rectangular) and the nanorod 412 is generally a cuboid comprise and extrusion of the end shape in the y-direction. The projection of the exposed end 412a may have side dimensions between 10 nm-20 nm.

Encompassing a nanorod 412 with a tapered/narrowed portion 410b can reduce peg temperatures significantly compared to a baseline model where the nanorod extends towards the media facing surface without any surrounding metal. The surrounding narrowed portion 410b, being formed from Rh for example, has good thermal transfer properties and fair plasmonic efficiency. The nanorod 412, being formed of Ir for example, has sufficient plasmonic efficiency to achieve the desired thermal gradients of the media hotspot. Both materials are mechanically robust, and therefore suitable for use at the harsh environment of the head-to-media interface.

In FIGS. 12-15, diagrams illustrate manufacturing of an NFT according to an example embodiment. Note that hatching is used in these figures to indicate different materials and not to indicate a cross sectional view. As seen in FIG. 11, the first plasmonic material 1102 is deposited on a substrate 1100. The substrate may include a sunken disc or the like that has been formed on optical quality dielectric materials. The first plasmonic material 1102 is formed via photolithography to have the enlarged portion shape 1107 (e.g., stadium shape) with the narrowed part 1108 extending towards the media-facing surface. A bevel is formed in the narrowed part 1108 at this stage, through a Damascene or milling operation. A mask 1104 is deposited on the first plasmonic material 1102 and a channel 110 is etched in the mask to define the shape of the nanorod.

Figures 11, 12, 13, 14, 15:
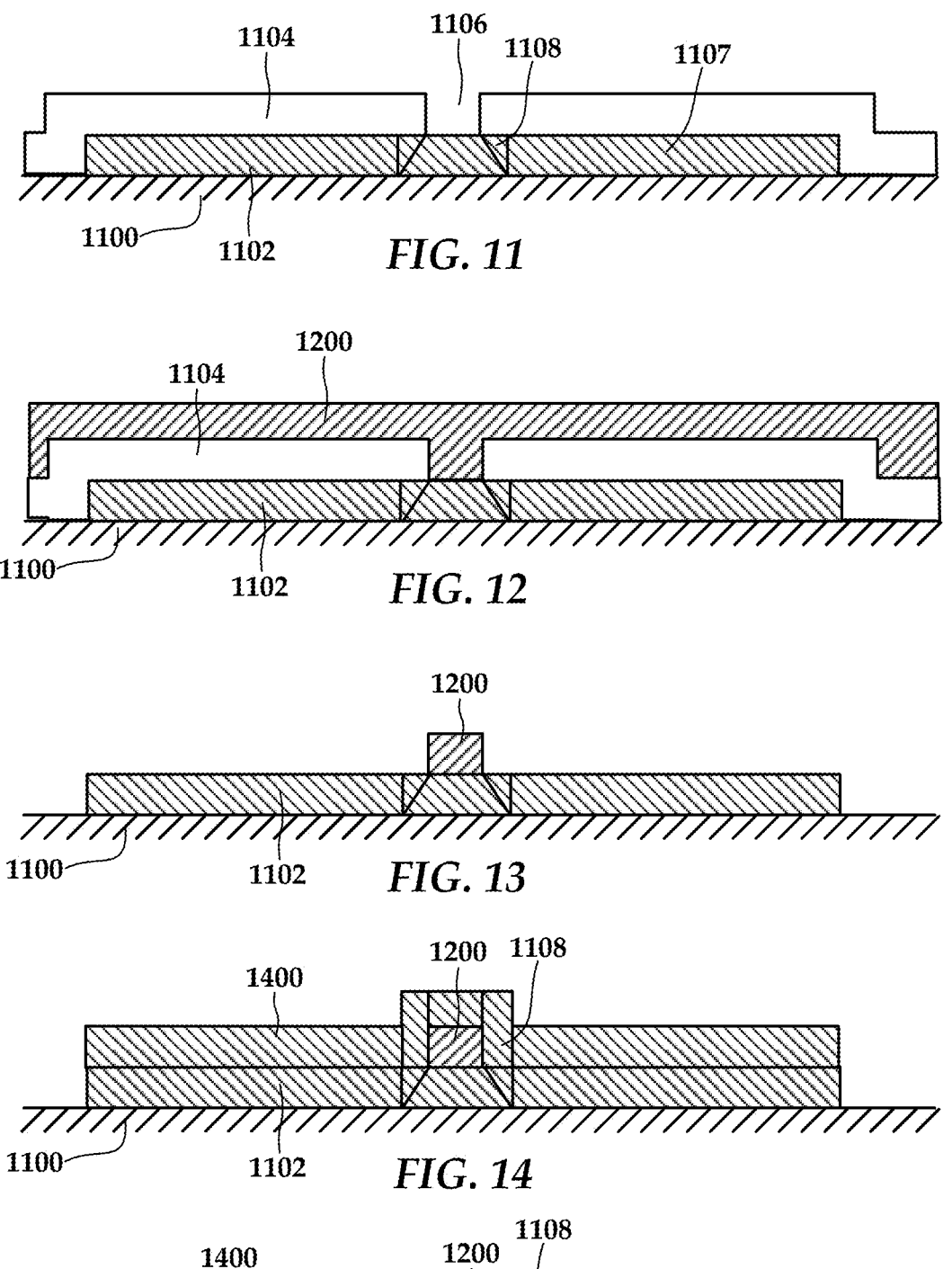
FIGS. 11-15 are diagrams showing manufacturing of an near-field transducer according to an example embodiment.

As seen in FIG. 12, the second plasmonic material 1200 is deposited over the mask 1104 to fill in the channel 1106. As seen in FIG. 13, excess second plasmonic maerial has been planarized and the mask 1104 has been removed so that the remaining second plasmonic material 1200 has the final shape of the nanorod. As seen in FIG. 14, a second layer 1400 of the first plasmonic material covers both materials 1102, 1200. This second layer 1400 will continue the outline shape of the first NFT part, thus extending the side bevels of the narrowed part 1108. As seen in FIG. 15, the top surface is planarized (e.g., via chemical-mechanical-polishing) leaving the final NFT structure. After this step, additional components such a MDSC 415 and heat sink 800 can be formed on top of the NFT.

Simulations of this design indicate that a peg of this size and shape (15 nm by 15 nm at the exposed end 412a(see, e.g., FIG. 7) provides a 15% ADC gain over existing designs with a larger peg cross sectional diameter. The narrowed portion 410b is able to reduce the peg temperatures to acceptable levels. Other measures of performance, such as thermal gradient, are improved by this design. Other temperatures, such as SDCS temperature, may see an increase depending on peg length, but within acceptable limits. These targets are achievable even in view of six sigma deviations from the nominal design, therefore should be provide high manufacturing yields.

In some embodiments, the thickness of the narrowed portion 410b surrounding the nanorod 412 can be increased. This will improve heat transfer away from the exposed end 412a, with some possibly decreased in coupling efficiency. In the example shown in FIG. 10, the width ratio of maximum crosstrack width 1000 to nanorod width 1002 is 40 nm/15 nm=2.67. Generally, a width ratio between 2.5 and 3.0 should provide adequate performance. This can be increased to a higher value, e.g., >3, in which case the width 1000 would be >45 nm. This would change the side bevel angles if the thickness of the narrowed portion 410b proximate the exposed end 412a is zero as shown. In other embodiments, narrow portion 410b may have a non-zero thickness proximate the exposed end 412a. A change in geometry at the bottom bevel 410b (see FIG. 9) can similarly change heat transfer performance.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise. Generally such terms are used herein to describe an orientation shown in the figure, and unless otherwise specified, are not meant to limit orientation of physical embodiments, e.g., relative to the Earth's surface.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

What is claimed is:

1. A near-field transducer for an energy-assisted, magnetic recording head, comprising:

a first part comprising a first plasmonic material, the first part having an enlarged portion configured to receive optical energy from a waveguide and a narrowed portion that receives and channels the optical energy to a recording medium; and a second part comprising a nanorod of a second plasmonic material different than the first plasmonic material, the nanorod disposed within the first part along a light propagation direction of the near-field transducer and extending to a media-facing surface of the recording head along the light propagation direction, the narrowed portion of the first part covering at least three sides of the nanorod along the light propagation direction, the nanorod having an exposed end that is exposed from the near-field transducer and faces the media-facing surface.

2. The near-field transducer of claim 1, wherein the first plasmonic material comprises Ir.

3. The near-field transducer of claim 2, wherein the second plasmonic material comprises Rh.

4. The near-field transducer of claim 1, wherein the second plasmonic material comprises Rh.

5. The near-field transducer of claim 1, wherein a down-track-facing surface of the first part faces a write pole such that an exposed side of the nanorod is between the first part and the write pole.

6. The near-field transducer of claim 1, wherein a distance that the narrowed portion extends from the enlarged portion defines a peg length of the near-field transducer, and wherein the peg length is between 40 nm and 15 nm.

7. The near-field transducer of claim 1, wherein the exposed end comprises a square shape.

8. The near-field transducer of claim 7, wherein the square shape comprises sides between 10 nm and 20 nm in length.

9. The near-field transducer of claim 1, wherein a ratio between a maximum cross track width of the narrowed portion and a crosstrack width of the nanorod is greater than 2.5.

10. The near-field transducer of claim 1, wherein the narrowed portion comprises three bevels that cover the at least three sides of the nanorod.

11. The near-field transducer of claim 10, wherein a surrounding thickness of the narrow portion proximate the exposed end of the nanorod is zero.

12. A recording head configured for energy-assisted recording, the recording head comprising:

a waveguide that receives optical energy from an energy source; and a near-field transducer comprising:

a first part comprising a first plasmonic material, the first part having an enlarged portion configured to receive the optical energy from the waveguide and a narrowed portion that receives and channels the optical energy to a recording medium; and a second part comprising a nanorod of a second plasmonic material different than the first plasmonic material, the nanorod disposed within the first part along a light propagation direction of the near-field transducer and extending to a media-facing surface of the recording head along the light propagation direction, the narrowed portion of the first part covering at least three sides of the nanorod along the light propagation direction, the nanorod having an exposed end that is exposed from the near-field transducer and faces the media-facing surface.

13. The recording head of claim 12, wherein the first plasmonic material comprises Ir.

14. The recording head of claim 13, wherein the second plasmonic material comprises Rh.

15. The recording head of claim 12, wherein the second plasmonic material comprises Rh.

16. The recording head of claim 12, further comprising a write pole, wherein a first downtrack-facing surface of the first part faces the write pole such that an exposed side of the nanorod is between the first part and the write pole.

17. The recording head of claim 16, further comprising a middle disc between the first downtrack-facing surface of the first part and the write pole.

18. The recording head of claim 16, further comprising a sunken disc disposed on a second downtrack-facing surface of the first part, the second downtrack-facing surface opposed to the first downtrack-facing surface.

19. The recording head of claim 12, wherein the narrowed portion comprises three bevels that cover the at least three sides of the nanorod.

* * * * *